(12) United States Patent
Bem et al.

(10) Patent No.: US 10,647,069 B2
(45) Date of Patent: May 12, 2020

(54) PROCESS AND DEVICE FOR THE PRODUCTION OF REINFORCED PLASTICS COMPONENTS

(71) Applicant: BASF SE, Ludwigshafen (DE)

(72) Inventors: Roman Bem, Mannheim (DE); Reinhard Jakobi, Maxdorf (DE); Philippe Desbois, Edingen-Neckarhausen (DE)

(73) Assignee: BASF SE, Ludwigshafen (DE)

( * ) Notice: Subject to any disclaimer, the term of this patent is extended or adjusted under 35 U.S.C. 154(b) by 309 days.

(21) Appl. No.: 15/517,639

(22) PCT Filed: Oct. 6, 2015

(86) PCT No.: PCT/EP2015/073043
§ 371 (c)(1),
(2) Date: Apr. 7, 2017

(87) PCT Pub. No.: WO2016/055473
PCT Pub. Date: Apr. 14, 2016

(65) Prior Publication Data
US 2017/0305076 A1    Oct. 26, 2017

(30) Foreign Application Priority Data
Oct. 7, 2014   (EP) .................................... 14187994

(51) Int. Cl.
*B29C 70/48* (2006.01)
*B29C 45/02* (2006.01)
(Continued)

(52) U.S. Cl.
CPC .............. *B29C 70/48* (2013.01); *B29C 45/02* (2013.01); *B29C 45/14786* (2013.01);
(Continued)

(58) Field of Classification Search
CPC . B29C 70/48; B29C 45/162; B29C 45/14786; B29C 67/246; B29C 45/461;
(Continued)

(56) References Cited

U.S. PATENT DOCUMENTS 8,470,216 B2 *   6/2013   Drube ................ B29C 44/0461
264/45.1
9,085,110 B2 *   7/2015   Scherzer ................ B05D 3/12
(Continued)

FOREIGN PATENT DOCUMENTS

DE           23 61 452 A1    6/1975
DE      10 2007 041678 A1    3/2009
(Continued)

OTHER PUBLICATIONS

Hennissen M B: "Automotive Applications of Epoxy Resin Transfer Moulding", Ingenieurs De L'Automobile, Editions VB, Garches, FR, No. 722, Jun. 1, 1998 (Jun. 1, 1998), pp. 40, 42-45, XP000774743, ISSN: 0020-1200.
(Continued)

*Primary Examiner* — Nahida Sultana
(74) *Attorney, Agent, or Firm* — Armstrong Teasdale LLP

(57) ABSTRACT

The present invention relates to a process for the production of reinforced plastics components. The process includes a) provision of at least one reinforcing material in a cavity of a molding device, b) provision of at least one starting material in a container, c) insertion of the container into the molding device, d) introduction of the at least one starting material from the container into the cavity, wherein the at least one starting material penetrates at least to some extent through the at least one reinforcing material, e) hardening of the at least one starting material with the at least one reinforcing material to give a reinforced plastics component, and f) demolding of the reinforced plastics component. The invention further relates to a device and to an assembly for the production of reinforced plastics components.

16 Claims, 7 Drawing Sheets

Figure 1:
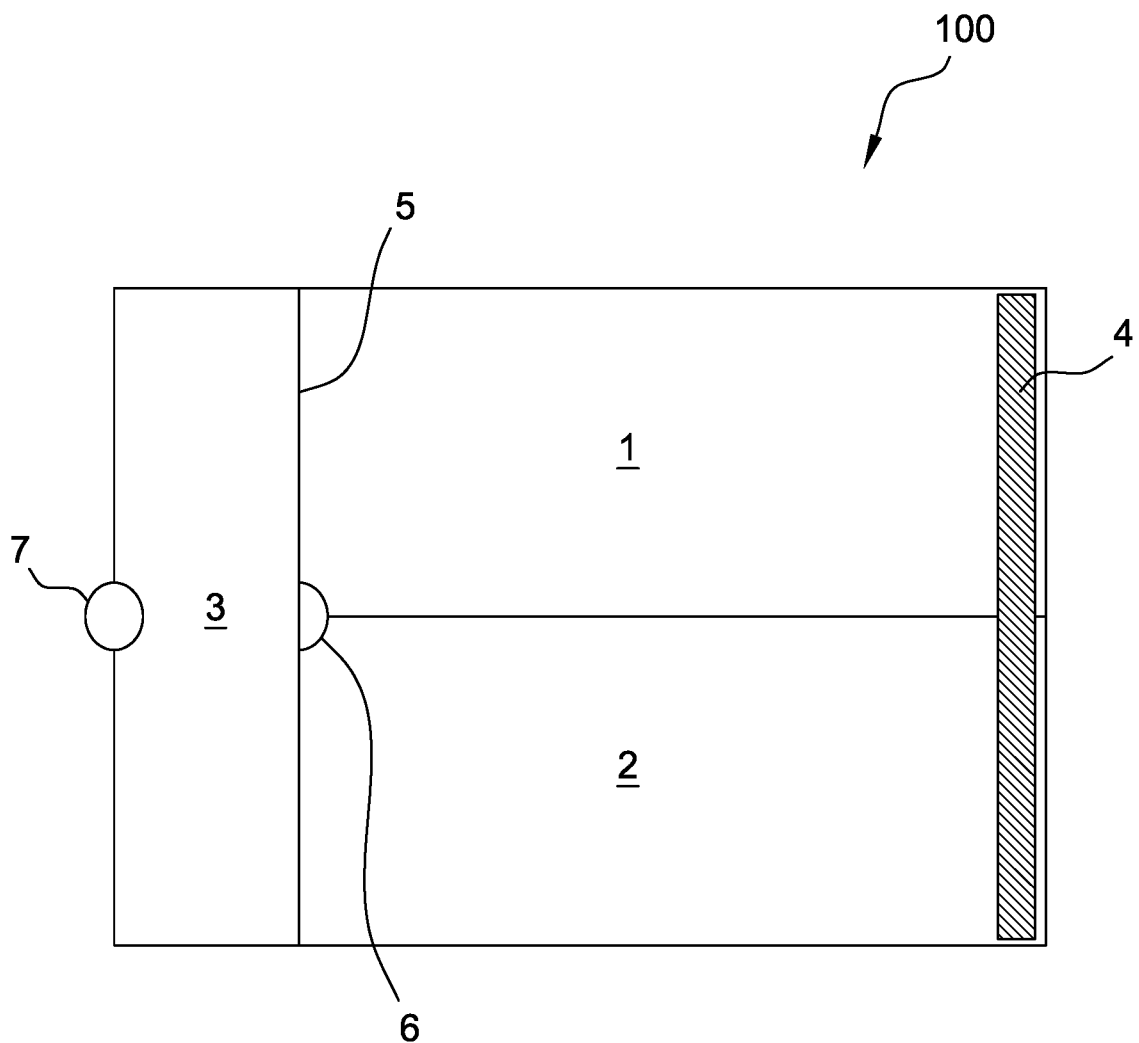

(51) Int. Cl.
   *B29C 45/14* (2006.01)
   *B29C 45/16* (2006.01)
   *B29C 45/46* (2006.01)
   *B29C 67/24* (2006.01)
   *B29K 77/00* (2006.01)
   *B29K 105/06* (2006.01)
   *B29K 63/00* (2006.01)
   *B29K 75/00* (2006.01)

(52) U.S. Cl.
   CPC .......... *B29C 45/162* (2013.01); *B29C 45/461* (2013.01); *B29C 67/246* (2013.01); *B29C 45/1628* (2013.01); *B29K 2063/00* (2013.01); *B29K 2075/00* (2013.01); *B29K 2077/00* (2013.01); *B29K 2105/06* (2013.01)

(58) Field of Classification Search
   CPC . B29C 45/02; B29C 45/1628; B29K 2077/00; B29K 2105/06; B29K 2075/00; B29K 2063/00
   See application file for complete search history.

(56) References Cited

U.S. PATENT DOCUMENTS

| | | | |
|---|---|---|---|
| 2007/0182048 A1* | 8/2007 | Ogawa | B01F 11/0082 264/45.3 |
| 2010/0043230 A1* | 2/2010 | Bhatti | B23P 15/26 29/890.046 |
| 2015/0284541 A1* | 10/2015 | Urayama | B29B 17/02 423/447.1 |
| 2018/0237603 A1* | 8/2018 | Spencer | C08G 59/4021 |

FOREIGN PATENT DOCUMENTS

| | | |
|---|---|---|
| DE | 102008047564 A1 | 3/2010 |
| EP | 1 375 591 A2 | 1/2004 |
| EP | 1415793 A1 | 5/2004 |
| EP | 2 572 851 A1 | 3/2013 |

OTHER PUBLICATIONS

International Search Report issued in PCT/EP2015/073043 dated Mar. 4, 2016.

* cited by examiner

PROCESS AND DEVICE FOR THE PRODUCTION OF REINFORCED PLASTICS COMPONENTS

CROSS-REFERENCE TO RELATED APPLICATIONS

This application is a U.S. National Phase Application of PCT/EP2015/073043, filed Oct. 6, 2015, which claims the benefit of priority to EP Application No. 14187994.0, filed Oct. 7, 2014, the contents of which are hereby expressly incorporated by reference in their entirety.

The present invention relates to a process, a device, and an assembly for the production of reinforced plastics components from at least one starting material as reactive system and from at least one reinforcing material.

The processing of reactive systems is usually associated with relatively complex conduct of a process. Particular factors that are decisive for the quality of the component and reproducibility thereof are the formulation of the mixture (the ratio of the starting materials, activators, and catalysts, and mixing of these), and also the protection of the system from environmental effects (e.g. moisture and light). The components used must generally be processed "dry", i.e. with exclusion of substances having adverse effects. The complex conduct of the process often requires relatively high investment by the processor in the technology of machinery and in extensive expertise. Restricted flexibility due to high cleaning cost for component changeover sometimes leads to low plant utilization. Long cycle times are moreover restricting the wider use of reaction injection molding (RIM) and resin transfer molding (RTM) technologies.

The RIM process has a long history and is also described in relevant standard works (cf. by way of example Domininghaus, Hans and Elsner, Peter and Eyerer, Peter and Hirth, Thomas (eds.), Kunststoffe: Eigenschaften und Anwendungen [Plastics: properties and applications], 7th edn., Springer-Verlag, Berlin, Heidelberg, 2008). The liquid reaction components are stored in heated containers and conveyed by precision pumps by way of heated lines into a mixing head. In some cases the reactive system circulates between mixing head and container. Changeover of material during the process is complex and incurs high cleaning cost by way of example for the containers, the metering pumps, the conveying lines, and the mixing heads. It is also the cause of waste of large quantities of starting materials, since long standing time at high temperatures reduces reactivity. Contact of the individual system components with air (and resultant oxidation) must also be avoided, because otherwise the system fails to react sufficiently and high residual monomer content remains in the component. A large amount of energy is moreover required for the heating of the individual parts of the plant, in order to keep containers, pumps, conveying lines, and mixing heads at a constant temperature.

DE 23 61 452 A1 describes a specialized process in which the metering pumps convey two reactive components directly by way of injection nozzles into the mold, in which they are then mixed with one another by the countercurrent method. Again in this case changeover of materials is associated with the problems described above.

EP 2 572 851 A1 describes a process for the production of thermoplastic fiber-composite materials in an injection-molding machine. The two components here are available separately in monomeric form in two injection-molding assemblies. One component comprises the activator, and the other component comprises the catalyst. The assemblies serve not only for the heating of the components but also for the conveying of the components to the mixing chamber. For smooth operation, the assemblies have to be installed at an angle to the horizontal. There are usually also hose lines connecting the assemblies to the mixing chamber and the mold. The injection-molding machine is of a specialized design, and therefore requires a high level of investment. The machine can be used only for RIM processes. It cannot be used in the form described for standard injection-molding applications. There is firstly the problem here that fluid systems are difficult to convey with screws, and secondly injection systems using pistons are very susceptible to problems related to very low viscosity of the monomer systems.

In the light of this, it is an object of the present invention to overcome the disadvantages of the prior art, and to provide a process which can reliably process starting materials in a simple manner to give reinforced plastics components. Another object of the present invention is to provide a corresponding device, and an assembly for the production of reinforced plastics components.

In a first aspect of the present invention, this object is achieved via a process for the production of reinforced plastics components which comprises the following steps:
a) provision of at least one reinforcing material in a cavity (16, 24, 43) of a molding device (11, 21, 41),
b) provision of at least one starting material in a container (100),
c) insertion of the container (100) into the molding device (11, 21, 41),
d) introduction of the at least one starting material from the container (100) into the cavity (16, 24, 43), where the at least one starting material penetrates at least to some extent through the at least one reinforcing material,
e) hardening of the at least one starting material with the at least one reinforcing material to give a reinforced plastics component, and
f) remolding of the reinforced plastics component.

In a second aspect of the present invention, the object is achieved via a device for the production of reinforced plastics components, comprising
one cavity (16, 24, 43) of a molding device (11, 21, 41) to receive a reinforcing material,
a reception device to receive at least one container (100) for at least one starting material,
a delivery device (4) for the delivery of the at least one starting material from the container (100), and
for the at least one starting material, a mixing unit (3) arranged between the reception device and the cavity (16, 24, 43).

The present invention has inter alia the advantage that it markedly increases the flexibility of known RIM/RTM processes in that different reactive systems can be processed in direct succession in one and the same device, because there is in essence no need for any extensive cleaning operations, i.e. the cleaning operations are in essence restricted to the cavity (16, 24, 29, 43, 44). It is thus possible to realize small and very small runs of components.

Insofar as device features are also listed in the description below in the context of the process of the invention, these preferably relate to the device of the invention, which is defined in more detail hereinafter. Equally, process features which may be mentioned in the context of the device preferably relate to the process of the invention.

The invention is described in more detail below.

The present invention firstly provides a process for the production of reinforced plastics components. It comprises the following steps:
a) provision of at least one reinforcing material in a cavity (16, 24, 43) of a molding device (11, 21, 41),
b) provision of at least one starting material in a container (100),
c) insertion of the container (100) into the molding device (11, 21, 41),
d) introduction of the at least one starting material from the container (100) into the cavity (16, 24, 43), where the at least one starting material penetrates at least to some extent through the at least one reinforcing material,
e) hardening of the at least one starting material with the at least one reinforcing material to give a reinforced plastics component, and
f) demolding of the reinforced plastics component.

The expression "starting material" means any component that is required in order to form a polymer via reaction. The expression "starting material" used here relates in the invention to monomeric or oligomeric starting materials which in particular comprise not only monomers and oligomers but also low polymers, and also respectively precrosslinked stages of monomers, oligomers, and low polymers. For simplicity the expression "starting material" is always used below.

The polymer can optionally also be formed via only one component, which comprises all of the additional substances required, but is prevented from reacting only because temperatures are too low. In the case of two starting materials, the mixture of more than one component can by way of example be composed of monomer 1 and monomer 2, of monomer 1 and catalyst and monomer 1 and activator, of monomer 1 and catalyst and monomer 2 and activator, or else any desired variant thereof.

For the purposes of the present invention, the expression "molding device" means a device which allows introduction of a starting material into a cavity and hardening thereof in said cavity. The molding device (11, 21, 41) used can in principle be a relatively conventional device, e.g. an injection-molding device, modified to be appropriate for the present invention.

The cavity (16, 29, 44) of the molding device (11, 21, 41) has in essence the negative of the shape of the component to be produced, in particular exactly the negative of the shape plus necessary sprues. The cavity (16, 24, 43) here can have a coating of a release agent which facilitates the demolding of the component.

In step a), the reinforcing material is preferably provided in the molding device (11, 21, 41) in a flexible, semirigid or rigid form.

The cavity (16, 24, 43) here can be formed by an injection mold, a simple (compression) mold, a half-shell with foil covering, or a double-walled structure (textile or foil). In one specific embodiment the cavity (16, 24, 43) can be formed by the reinforcing material, in particular a reinforcing textile, itself.

In the invention the at least one starting material is provided in step b) in a container (100) designed not only for storage but also for transport and introduction of the at least one starting material into the cavity (16, 24, 43). The container (100) of the invention is advantageously configured as a closed container, which protects the at least one starting material from external influences (e.g. air, atmospheric moisture, inward radiation of light) during storage and transport. The container more particularly has an inherently stable configuration, in order reliably to receive the at least one starting material. In relation to the molding device (11, 21, 41), the container (100) of the invention represents an external container, which is not part of the molding device (11, 21, 41). It is filled and closed prior to the process of the invention, preferably directly at the premises of the producer of the at least one starting material, and is not opened again until during the process of the invention.

The container (100) of the invention can in particular be a single-use container. Once emptied it can be sent for disposal or by way of example remain in the form of a reinforcing rib (30) in the finished component. If the container (100) is a relatively large unit it is preferable that this is a multiple-use container, optionally a multiple-use container for which a deposit is payable. This embodiment has the advantage that no containers (100) have to be cleaned by the processor; instead, the producer assumes that responsibility.

A substantial advantage of the container (100) of the invention is that the at least one starting material has protection from environmental effects directly after production thereof, and this remains the case until the moment at which it is introduced into the cavity (16, 24, 43). Correct metering of the at least one starting material can be ensured even before it leaves the producer. There is no requirement for any predrying or pretreatment, e.g. cleaning/filtration, of the at least one starting material before processing.

The container (100) of the invention is suitably inserted into the molding device (11, 21, 41) in step c). To this end there are preferably appropriately sized receptacles/holders provided for the container (100), and also connections for the at least one starting material from the container (100) into the cavity (16, 24, 43). The container (100) of the invention still remains closed during the insertion in step c) and the at least one starting material is thus further protected.

The viscosity of the at least one starting material can be established in step d) directly in the container (100) immediately before introduction into the cavity (16, 24, 43). Because of the short distance between container (100) and cavity (16, 24, 43) standing times of the at least one starting material are short, and there is therefore no longer any requirement in the invention for the heated tanks and lines of the prior art. Because of the short distances traveled by the at least one starting material to enter the cavity (16, 24, 43) the specified temperature of said material can be maintained very precisely. It is thus possible to use reactive systems with shorter reaction times, thus allowing cycle times that are shorter than in the prior art.

The introduction of the at least one starting material in step d) takes places preferably directly from the container (100) into the cavity (16, 24, 43), without the at least one starting material being passed through lines or pumps. The at least one starting material possibly travels through a mixing unit (3) in step d). With preference in accordance with the invention, the closed container (100) is opened only at step d), in order for the at least one starting material to be introduced into the cavity (16, 24, 43).

The viscosity of the at least one starting material used in the invention is comparatively low: from 1 mPa·s to 1000 mPa·s, preferably from 3 mPa·s to 500 mPa·s, in particular from 5 mPa·s to 200 mPa·s. It is therefore difficult to handle in conventional injection-molding devices. However, problem-free handling is possible with the features of the present invention. In particular by virtue of the low viscosity the at least one starting material can penetrate in essence completely through the reinforcing material provided in the cavity (16, 24, 43) and thus ensure a homogeneous component.

The at least one starting material can comprise additives, for example a blowing agent, so that after introduction into the cavity (16, 24, 43) a foam structure is produced which leads to additional weight reduction of the finished component.

The hardening of the at least one starting material in the cavity (16, 24, 43) in step e) is achieved by virtue of the reactivity of the system, and can be assisted and/or accelerated via a suitable temperature of the cavity (16, 24, 43).

On demolding of the finished component in step f), the container (100) is also, alongside the sprue, removed from the device unless, as mentioned above, said container remains as functional element (30) in the component.

With the present invention the process step which is necessary in the prior art and which comprises the metering of the starting material(s) and optionally additives is displaced from the actual production process, preferably directly to the producer of the at least one starting material. The distances traveled by the at least one starting material within the molding device (11, 21, 41) are moreover markedly reduced, since the at least one starting material is introduced directly from the container (100), optionally through the mixing unit (3), into the cavity (16, 24, 43). In this way, and optionally through a number of other features described hereinafter, the production process for a reinforced plastics component is considerably simplified.

When the process of the invention is used, there is no requirement to clean storage containers and metering pumps, or conveying lines, or mixing heads as used in a traditional RIM/RTM device. All residues are demolded, or removed, together with the sprue and the container (100), and cannot hinder or contaminate the following production cycle.

The processor of the at least one starting material requires no in-depth expertise in relation to the chemistry of the reactive systems, and nor is such expertise essential to ensure the quality of the finished component and the reproducibility of the production process. The engineering involved in the process is moreover very simple and, because of carefully design, requires only low levels of knowledge from the processor. This is achieved via the containers, delivered from the producer, with starting materials and optionally additives and, respectively, the assembly of the invention for the production of reinforced plastics components, i.e. via an appropriately designed "construction kit".

Another advantage of the process of the invention is that it provides particularly high flexibility. Changeovers in the material of the finished component are by way of example possible without difficulty. Different reactive systems can be processed to a greater or lesser extent in direct succession without any adverse effect on one another. It is even possible to change color from one component to the next. Cost-effective manufacture can actually extend as far as individual units.

The process of the invention is in particular advantageous for single-component systems where the starting material(s) is/are present optionally together with other additives in a container (100), and hardening, i.e. production of the desired component, can be controlled entirely by way of the temperature.

A more advanced embodiment of the process provides, in step b), at least one first starting material in a first container (100a) and one second starting material in a second container (100b). What has been stated above for the container (100) applies accordingly to the first container (100a) and the second container (100b). This embodiment is advantageous for reactive systems made of two or more starting materials, because these can be respectively stored separately from one another in a container (100a, 100b), transported, and used in the process of the invention. It is thus possible to preheat two different starting materials to different temperatures (e.g. in order to establish viscosity), or to provide different colors in the two containers (100a, 100b). In each case there is an increase in the ability to vary the supply of materials to the molding device (11, 21, 41).

When at least two starting materials are used it has moreover proven advantageous for the reaction that in step c) and/or before step d) at least the first starting material from the first container (100a), or from a first chamber (1) of the container (100), and the second starting material from the second container (100b), or from a second chamber (2) of the container (100), are mixed with one another in a mixing unit (3). It is thus firstly ensured that the starting materials have already been adequately mixed before they are introduced into the cavity (16, 24, 43); secondly, the reaction rate is increased.

The mixing of the at least two starting materials can be achieved with the aid of appropriate pressure generators by the impact method or counterflow method. The at least two starting materials can be further mixed during introduction into the cavity (16, 24, 43). Alternatively, or else additionally, the mixing can be achieved, or intensified, in a runner (15) upstream of the cavity (16, 24, 43), for example via a static mixer or an open-pored structure (foam structure). The surface and/or shape of the runner (15) can be structured in such a way as to produce turbulent flow and to increase the intensity of mixing of the at least two starting materials.

An advantage of the process of the invention is that the flexibility of the injection-molding process is increased via the addition of another (reactive) component in the same mold. The process of the invention can moreover also be used for compression processes (i.e. without injection molding).

Another advantage of the process of the invention is that the starting material(s) is/are provided in prepared portions for a particular component or a number of components. In one preferred embodiment this is achieved in that the volume of the at least one starting material, or the sum of the volumes of the first starting material and of the second starting material, in essence corresponds to the unoccupied volume of the cavity (16, 24, 43) of the molding device (11, 21, 41).

The wording "in essence" in this context means that alongside the quantity actually required to fill the cavity (16, 24, 43) there are additionally from 2% to 30%, preferably from 5% to 20%, in particular from 10% to 15%, of said required quantity present to provide process reliability. In practice the quantity required and provided for the production process generally already includes this safety margin. The starting material(s) consumed for sprues, flash, quantities remaining unused in the container, etc. are thus taken into account. By virtue of this embodiment it is also possible to produce individual components without any need to use disproportionately large quantities of material or to discard the unused material as waste. Preferably, the mixing unit (3), which can be part of the container (100) or the container (100a, 100b), is also removed and disposed of.

For certain types of reactive systems used in the invention it has proven to be advantageous that, prior to step c), in step d), or before step e), the starting material is activated, in particular thermally, chemically, and/or mechanically. It is also possible here to combine various activation measures, for example provision of a chemical activator together with heating of the starting material(s). The starting material is activated (generally once).

The starting material can be activated in the container (100) before the insertion of the container (100) into the molding device (11, 21, 41) (step c)), for example thermally via heating of the container (100) in an oven. Establishment of viscosity can be achieved at the same time as this activation.

Alternatively the starting material can be activated during introduction into the cavity (16, 24, 43) (step d)), e.g. mechanically via a static mixer (i.e. mixing unit (3)) between the container (100) and the cavity (16, 24, 43), or thermally via an appropriately temperature-controlled cavity (16, 24, 43). If two starting materials (optionally with additives) are introduced into the cavity (16, 24, 43), mixing of these can also bring about chemical activation.

An example of another possibility for (thermal) activation is temperature-control of the cavity (16, 24, 43) after introduction of the starting material, in such a way that the activation is achieved before hardening (step e)).

It is moreover possible that the at least two starting materials are preheated to different temperatures in their respective containers (100a, 100b), in order to activate them and/or to establish a viscosity desired for the process. In another more advanced embodiment, said preheating can also be achieved outside of the actual device, for example in a suitable oven before the insertion of the containers (100a, 100b) into the device.

Equally, it can be advantageous that an activator and/or a catalyst is/are already additionally comprised in the at least one starting material. Ideal distribution of the activator and/or of the catalyst, and thus ideal progress of the reaction, are thus already ensured before the actual production process. This is in particular advantageous when the starting material is stored and transported at ambient temperatures, and activation is initiated, thermally in an oven directly alongside the device (11, 21, 41), and/or mechanically, only when the material is in place, i.e. in the device (11, 21, 41).

In one process embodiment in which at least two starting materials are used in separate containers (100a, 100b) it is advantageous, inter alia for the stability of the starting materials in storage, that the first starting material in the first container (100a) additionally comprises an activator, and/or that the second starting material in the second container (100b) additionally comprises a catalyst. Mixing of the at least two starting materials with one another as described above is immediately followed by activation and/or catalysis.

In another embodiment of the invention it is possible, as alternative to the above, to add at least one activator and/or at least one catalyst to the at least one starting material in step c). This alternative can in particular be adopted for reasons associated with the chemistry of the starting materials, activators, and/or catalysts, for example because activation and reaction of the system occurs at temperatures as low as room temperature. By way of example, it is possible to introduce the at least one starting material into the cavity (16, 24, 43) through another container (100) which comprises an activator and/or a catalyst.

Selection of the reinforcing material from the group consisting of woven fabrics, laid scrims, rovings, knitted fabrics, braided fabrics, and combinations thereof depends on the nature of the component to be produced and its use or application. This selection advantageously permits ideal placing of the respective fibers of the reinforcing material in the cavity (16, 24, 43).

The introduction of the at least one starting material from the container (100) into the cavity (16, 24, 43) in step d) can advantageously be achieved by means of a piston (4), by means of reduced pressure in the cavity (16, 24, 43), or by means of a squeeze roll in each case acting on the at least one starting material in the container (100). It is thus possible to determine the penetration time, also known as the saturation time or the impregnation time of the reinforcing material, by way of the velocity at which, for example, the piston (4) is moved. Alternatively, the penetration rate can be changed and appropriately adjusted by establishing a (variable) reduced pressure in the cavity (16, 24, 43).

It is moreover possible to "squeeze" the container (100) between two plates or squeeze rolls in a defined manner, i.e. at a prescribed rate. Another alternative is application of compressed air to the container (100).

It is important that pressure applied to the at least one starting material provided in a container (100) is sufficient to introduce same as completely as possible into the cavity (16, 24, 43). To this end, the flow channels in the respective container (100) and/or in the cavity (16, 24, 43) can be of a particular design.

The design of the container (100) of the invention for receiving the at least one starting material can differ, depending on the nature and quantity of the starting material. In particular, the container is selected from the group consisting of tubular bag, double-chamber bag, cartridge, capsule, drum, beaker, vessel, pad and combinations thereof. According to the invention, preference is given as container (100) or container (100a, 100b) to tubular bags, double-chamber bags, cartridges or capsules.

In one particularly preferred embodiment of the process of the invention, the at least one starting material provided in step b) comprises caprolactam. In particular it is possible to provide two components, one of which is caprolactam with an activator, and one of which is caprolactam with a catalyst.

The process of the invention is in particular suitable for the production of continuous-fiber-reinforced components with polyamide matrix. The viscosity of caprolactam-based reaction systems (about 5 mPa·s), low in comparison with epoxy resins and polyurethane resins, assists the infiltration of the reinforcing textiles. It is thus possible to achieve infiltration of, in particular, large-surface-area and thin-walled components more efficiently, i.e. with relatively low fill pressures and with shorter cycle times. The polyamide produced by polymerization of the caprolactam can, as thermoplastic, be subjected to forming processes when heated, and thus can also in particular be further processed in multistage processes. Combination of the process of the invention with traditional injection molding allows production of individual component elements as required with different fill materials and different reinforcing materials, but with a matrix that is identical or of related type; this in turn has a favorable effect on compatibility between the functional and supportive elements. It is thus possible by way of example to produce good adhesion between short-glass-fiber-reinforced ribs and continuous-fiber-reinforced laminate, and to regrind or recycle the entire component.

The above statements and preferences for the process of the invention are valid for the device of the invention, described below, and for the assembly of the assembly, described below. Similarly, the observations and preferences below for the device of the invention are valid correspondingly for the process of the invention.

The present invention secondly provides a device for the production of reinforced plastics components which comprises
- one cavity (16, 24, 43) of a molding device (11, 21, 41) to receive a reinforcing material,
- a reception device to receive at least one container (100) for at least one starting material,
- a delivery device (4) for the delivery of the at least one starting material from the container, and
- for the at least one starting material, a mixing unit (3) arranged between the reception device and the cavity (16, 24, 43).

As already indicated above, the cavity (16, 24, 43) of the molding device (11, 21, 41) has in essence the negative of the shape of the component to be produced.

The reception device of the invention is designed to receive, precisely position and fix at least one container (100). The reception device has a free volume for receiving the at least one container (100), and a form-fitting or force-fitting mechanism for fixing the at least one container (100). Triggered actively by the plant control system or passively, the mechanism may fix the at least one container (100) or release it after the delivery of the at least one starting material.

In one development of the invention, the reception device may form a construction assembly together with the delivery device (4).

A starting material is both stored and transported in the container (100) of the invention, and is introduced directly therefrom into the cavity (16, 24, 43). From production of the starting material until same is finally processed it is therefore protected from environmental effects.

The design of the delivery device (4) can vary, and this device advantageously comprises a piston (4) which acts on the container (100) and the at least one starting material present therein. The velocity at which the piston (4) is moved here can be adjusted within wide limits. It is moreover possible to "squeeze" the container (100) between two plates or by means of a squeeze roll in a defined manner. Equally, the delivery device (4) can be a device which generates a reduced pressure in the cavity (16, 24, 43) and thus acts on the starting material. The delivery device (4) here can take the form of separate device (e.g. for reduced pressure, squeeze roll) or of part of the container (100) (e.g. piston (4)).

The mixing unit (3) of the invention ensures intensive mixing of the at least one starting material, in particular in cases where there is an additive admixed with the at least one starting material, or in cases where two or more starting materials are processed. The mixing unit (3) can also be designed as single-use mixing unit which is sent for disposal after use.

The device of the present invention markedly shortens the distances required in the prior art that are traveled by the at least one starting material within the molding device (11, 21, 41). In this way, and optionally through a number of other features described hereinafter, the production device for a reinforced plastics component is considerably simplified. Required investment is reduced, and the device of the invention is therefore of interest to, and cost-effective for, a wider range of users.

In particular, there are no storage containers and metering pumps present, or conveying lines and mixing heads as used in a traditional RIM/RTM device; these require cleaning after use.

Another advantage of the device of the invention is high flexibility which by way of example permits problem-free changeovers in the material of the finished component. By virtue of the displacement of the necessary equipment into the container (100) and, respectively, to a position directly upstream of the cavity (16, 24, 43), the invention can also be applied to a conventional device, e.g. an injection-molding device.

In one particular embodiment the design of the molding device can be that of a turntable mold (41) or cube mold (21), these being as known from injection-molding processes. This mold (21, 41) is used in a conventional injection-molding device with core-puller equipment. The core pullers serve to apply pressure to the at least one container (100) and thus to introduce the at least one starting material into the cavity (16, 24, 43). The turntable mold (41) or cube mold (21) is then rotated, and the component is then overmolded with a standard thermoplastic. Ribs, stiffeners, and other functional elements (30) for fastenings, etc. can thus be molded onto the material. In a conventional injection-molding device with appropriate control system for turntable molds (41) or cube molds (21) it is thus possible to produce a component manufactured from two different (polymeric) materials. The overmolding material can by way of example also be a toughness-modified material.

One of the sides of the mold (21, 41) can supply the high temperatures for the RIM hardening process, while the other side supplies the lower temperatures for overmolding with a traditional thermoplastic material. It is therefore very easy to functionalize the mostly flat-surface RIM component.

In a more advanced embodiment of the device of the invention the reception device comprises at least one device for the activation of the at least one starting material in the at least one container (100). This device can by way of example be a heater, a mechanical mixer, or a device for irradiation with light.

For rapid and risk-free operation of the device of the invention it has proven advantageous that the mixing unit (3) is integrated into the at least one container (100). This firstly saves a mixing head which would require complicated cleaning. This embodiment is useful in particular when containers (100) have two or more chambers (1, 2) in which two or more starting materials are present.

Another variant of the invention provides that by way of example two starting materials from their respective container (100) are combined in the mixing unit (3) of one of the two containers. It is thus also possible to omit the mixing unit (3) in one of the two containers (100).

In a more advanced embodiment the device of the invention can comprise at least one first cavity (24, 43) and one second cavity (29, 44) of the molding device (21, 41) where the volume of the at least one first cavity (29, 44) differs from that of the at least one second cavity (24, 43). In particular the volume of the at least one second cavity (24, 43) is greater. This more advanced embodiment permits molding-on of functional elements via an injection-molding process.

The present invention thirdly provides an assembly for the production of reinforced plastics components which comprises the following constituents
i) at least one reinforcing material in a cavity (16, 24, 43) of a molding device (11, 21, 41),
ii) at least one starting material in at least one container (100), and
iii) at least one activator effective for the at least one starting material, and/or at least one catalyst effective for the at least one starting material.

The at least one reinforcing material here has a surface modification that is chemically and/or physically appropriate for the at least one starting material.

More particularly the assembly comprises:
i) at least one reinforcing material having a surface modification which is tailored chemically and/or physically to the at least one starting material,
ii) at least one starting material in at least one container (100), and
iii) at least one activator effective for the at least one starting material, and/or at least one catalyst effective for the at least one starting material.

For the purposes of the present invention, the term "assembly" means a type of kit which is provided to an end user or to a processor. The producer (supplier) can supply the processor with a complete package composed of reinforcing material(s) and reactive system(s) together with engineering support. The processor can process a reactive system in a manner very similar to, and in devices very similar to, that/those customarily used by said processor by way of example for thermoplastics. In-depth process expertise on the part of the processor is not a decisive factor determining the quality of the component and the reproducibility of the process. This is provided by the producer, who assumes responsibility for the material, and for the uniformity and reactivity of the starting materials, and thus for a substantial part of the process. The assembly of the invention can be stored and transported readily and is highly manageable by virtue of the constituents i), ii) and iii), present separately from one another.

Examples of the reinforcing material and the starting material/s have already been given above in connection with the process of the invention.

Examples of the invention for the surface modification of the reinforcing material include a fiber size (fiber coating) adapted to the reactive system in order to improve fiber/matrix binding.

In the case of caprolactam as the at least one starting material, examples of activators are aliphatic diisocyanates such as butylene diisocyanate, hexamethylene diisocyanate, octamethylene diisocyanate, decamethylene diisocyanate, undodecamethylene diisocyanate, dodecamethylene diisocyanate, and also aromatic diisocyanates, such as tolyl diisocyanate, isophoron diisocyanate, 4,4'-methylenebis (phenyl isocyanate), 4,4'-methylenebis(cyclohexyl isocyanate), or else polyisocyanates such as isocynurates of hexamethylene diisocyanate, Basonat® HI 100 from BASF SE, allophanates such as ethyl allophanate or mixtures thereof; preference is given to hexamethylene diisocyanate and isophoron diisocyanate, particular preference to hexamethylene diisocyanate. The diisocyanates may be replaced by monoisocyanates.

Suitable alternative activators include diacyl halides, such as butyleneiacyl chloride, butylenediacyl bromide, hexamethyleneiacyl chloride, hexamethyleneiacyl bromide, octamethyleneiacyl chloride, octamethyleneiacyl bromide, decamethyleneiacyl chloride, decamethyleniacyl bromide, dodecamethyleneiacyl chloride, dodecamethyleneiacyl bromide, and also aromatic diacyl halides such as tolylenediacyl chloride, tolylenemethylenediacyl bromide, isophorondiacyl chloride, isophorondiacyl bromide, 4,4'-methylenebis (phenyl)acyl chloride, 4,4'-methyelenbis(phenyl)acyl bromide, 4,4'-methyelenbis(cyclohexyl)acyl chloride, 4,4'-methyelenbis(cyclohexyl)acyl bromide, or mixtures thereof; preference is given to hexamethylenediacyl chloride, hexymethylendiacyl bromide or mixtures thereof, particular preference to hexamethylenediacyl chloride. The diacyl halides may be replaced by monoacyl halides.

A further, alternative activator preferred is N,N'-hexane-1,6-diylbis(hexahydro-2-oxo-1H-azepin-1-carboxamide) (the commercial product Bruggolen® C 20).

Examples of catalysts include sodium caprolactamate, potassium caprolactamate, bromide magnesium caprolactamate, chloride magnesium caprolactamate, magnesium biscaprolactamate, sodium hydrides, sodium metal, sodium hydroxide, sodium methoxide, sodium ethoxide, sodium propoxide, sodium butoxide, potassium hydride, potassium metal, potassium hydroxide, potassium methoxide, potassium ethoxide, potassium propoxide and potassium butoxide. The catalyst is preferably selected from the group encompassing sodium hydrides, sodium metal, sodium caprolactamate; particularly preferred is sodium caprolactamate (e.g. the commercial product Bruggolen® C 10, a solution of 18% by weight of sodium caprolactamte in caprolactam).

The present invention comprises all reactive systems for polymer production. Preferred systems are EP-, PU-, and PA-RIM systems, and anionic PA systems are particularly suitable because of their low viscosity during saturation of the fibers.

Other objectives, features, advantages, and possible applications are apparent from the description hereinafter of working examples of the present invention with reference to the figures, where all of the features, individually or in any desired combination, that are described and/or depicted are part of the subject matter of the present invention, irrespective of whether they appear together in the claims or in a reference back to other claims.

Figure 2A:
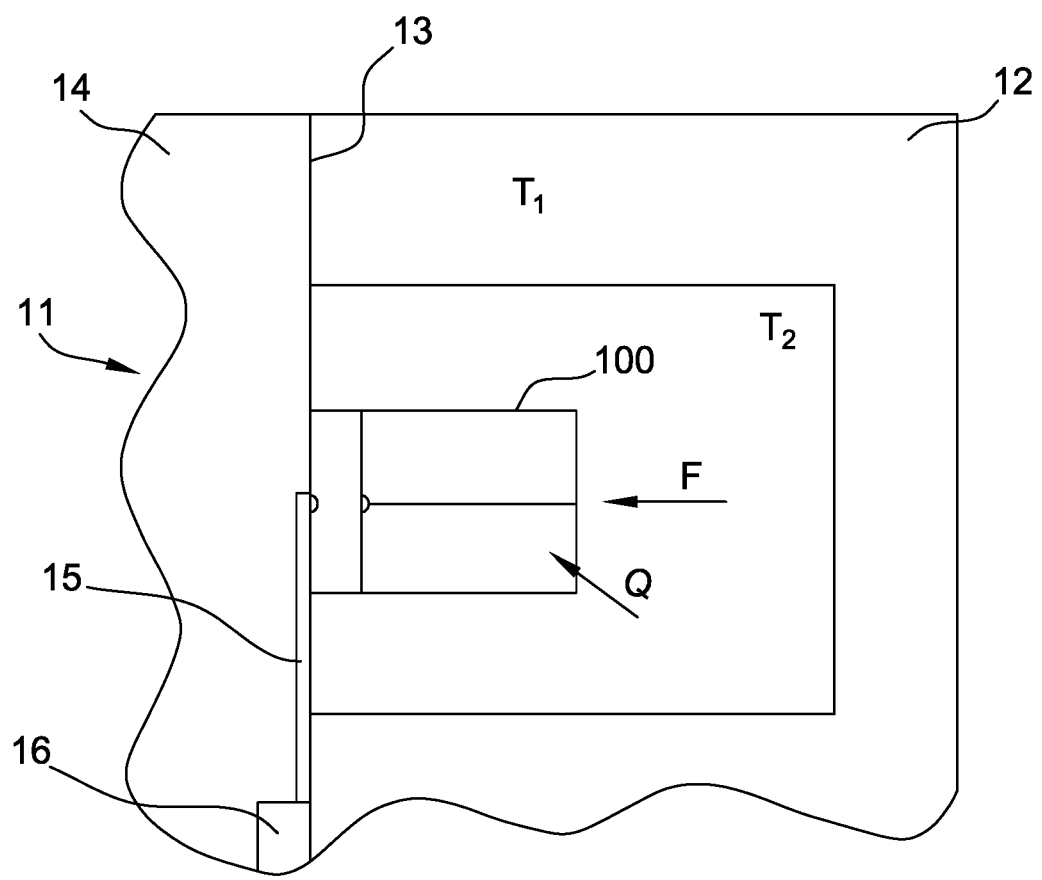
Figure 2B:
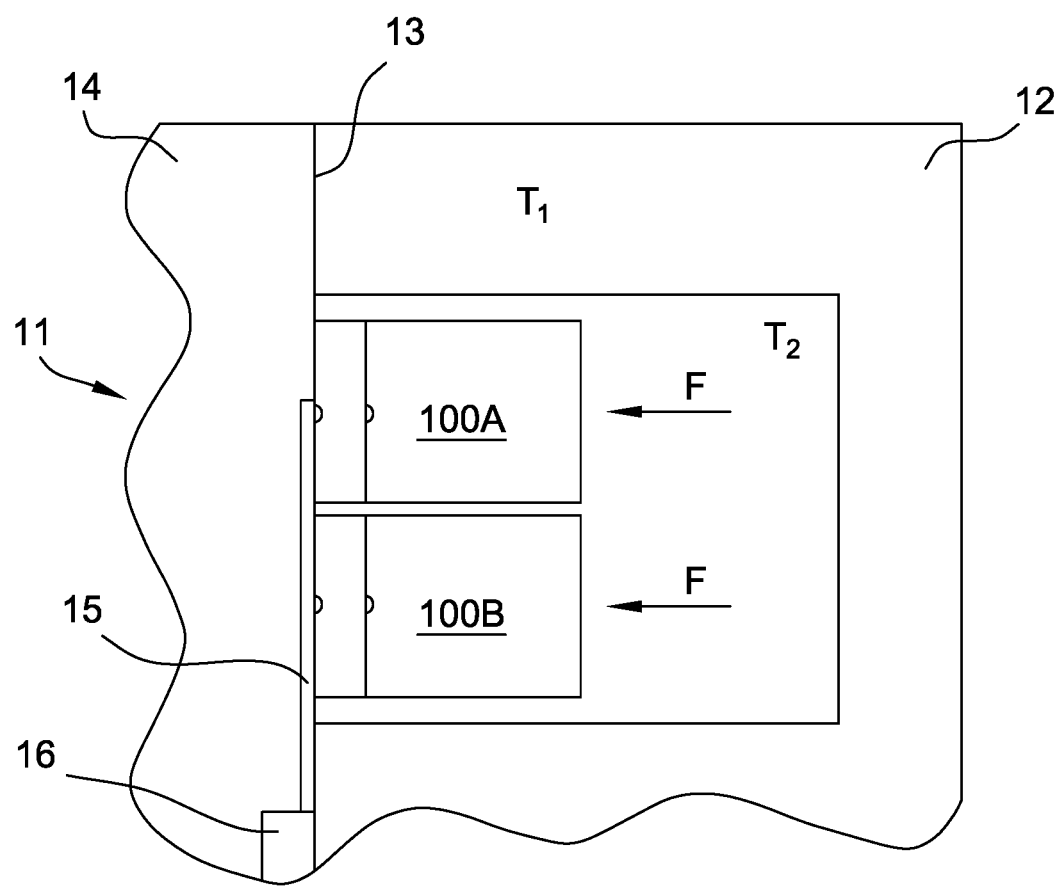
Figure 3:
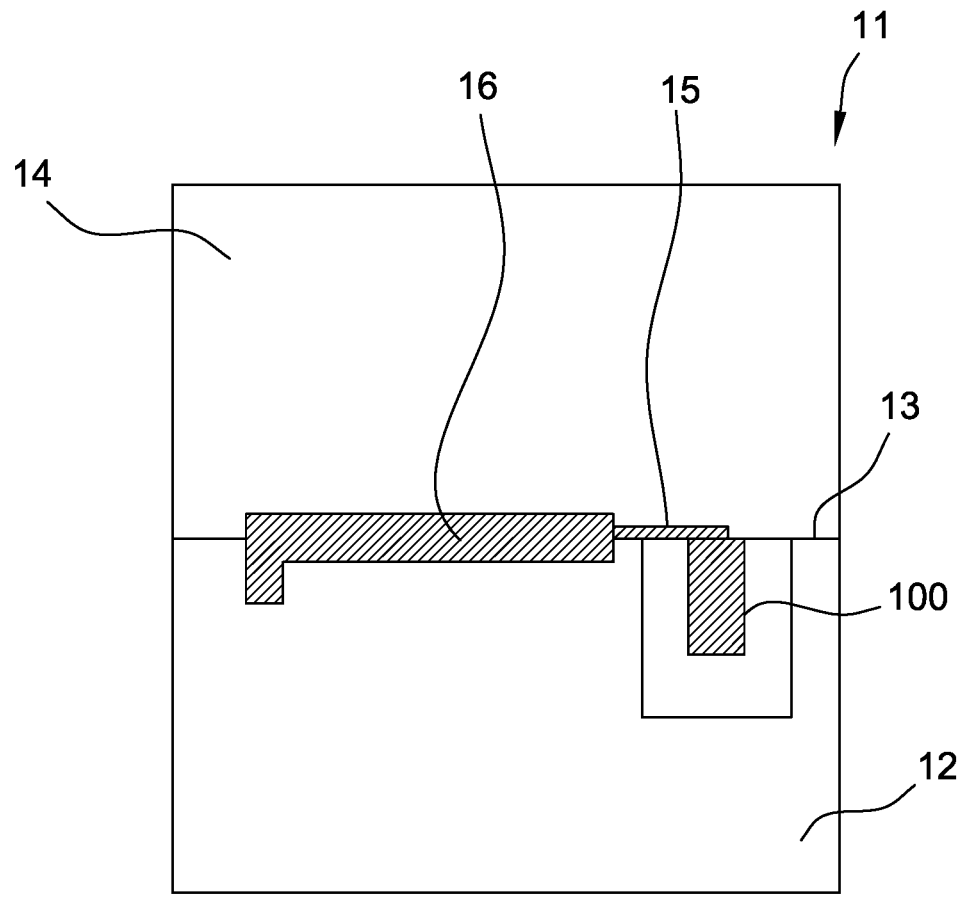
Figure 4:
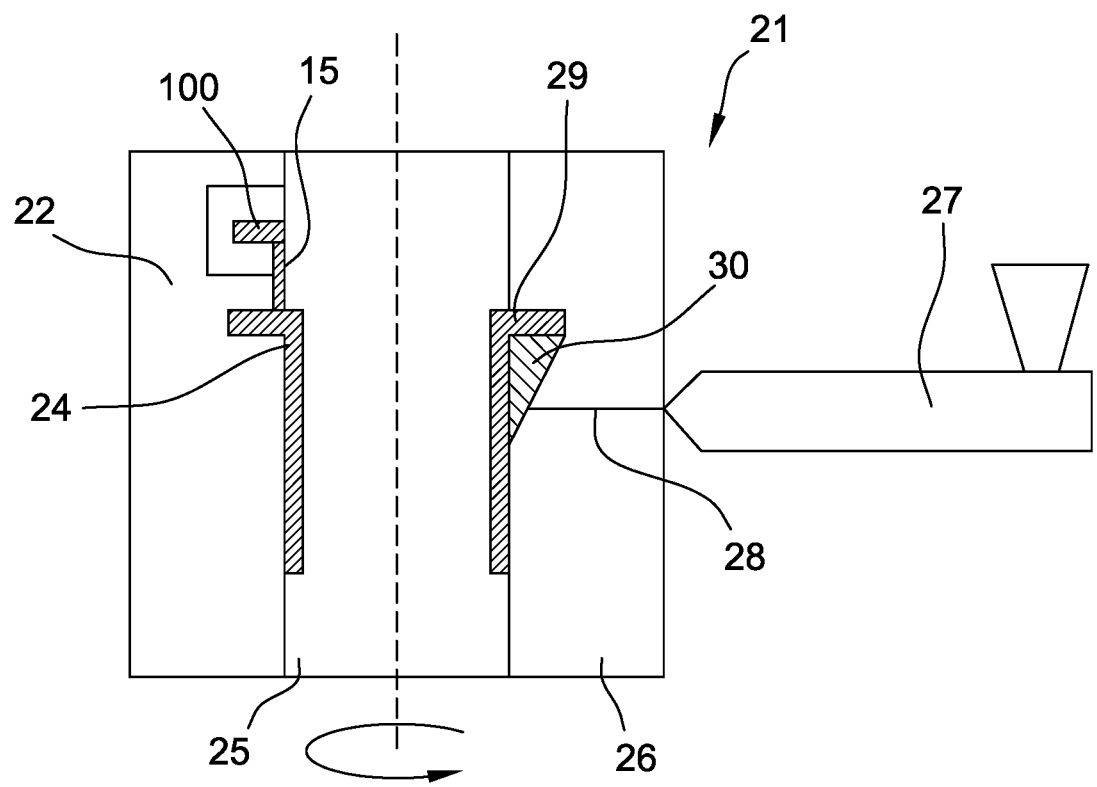
Figure 5:
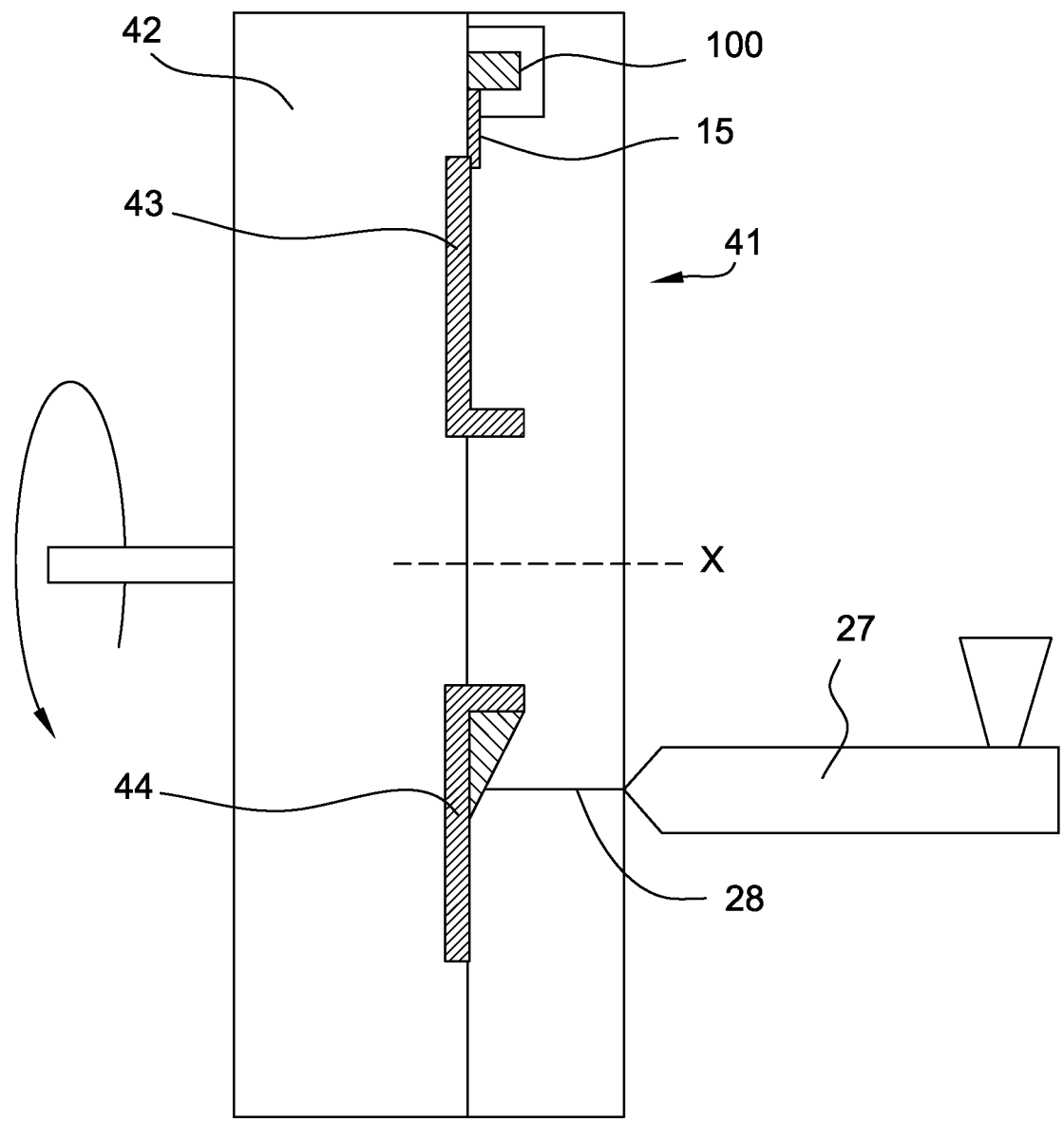
Figure 6:
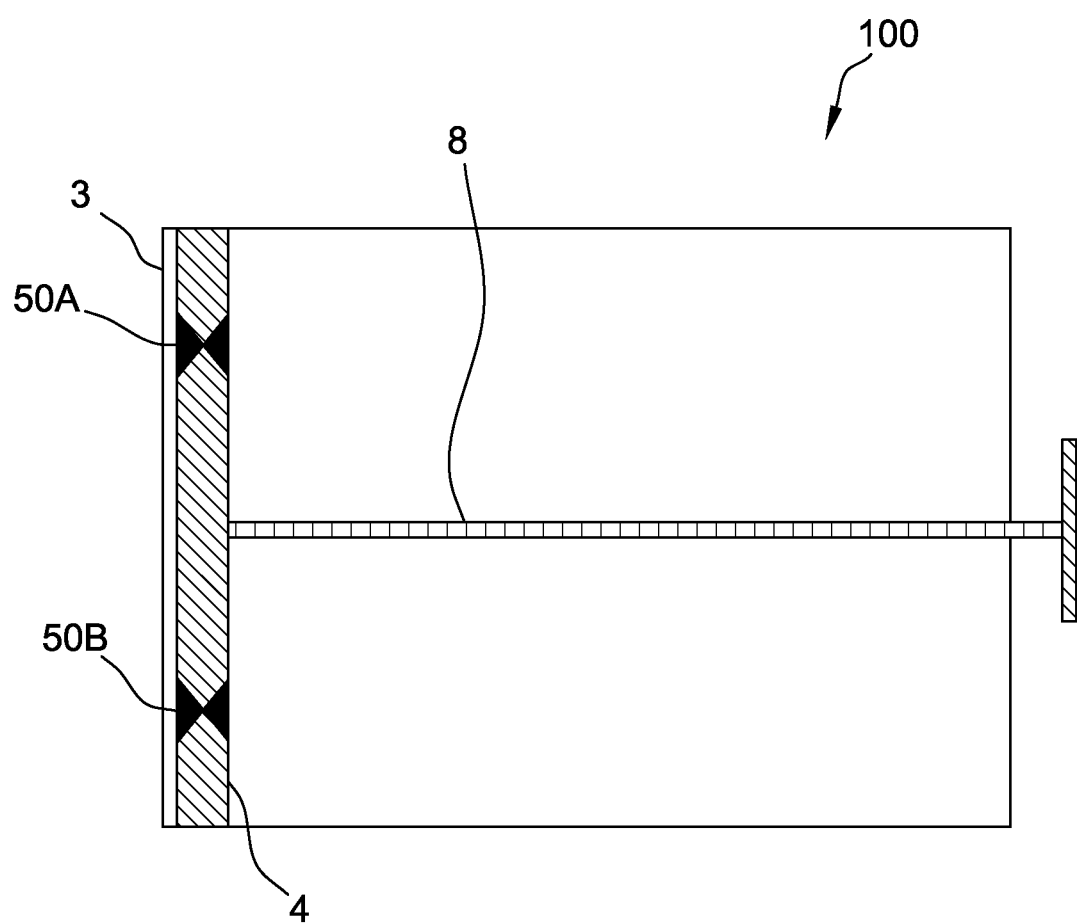

FIG. 1 is a diagram of a container 100 in one embodiment of the invention, FIG. 2a is a diagram of a part of a molding device 11 in one embodiment of the invention with a container 100, FIG. 2b is a diagram of a part of a molding device 11 in one embodiment of the invention with two containers 100a, 100b, FIG. 3 is a diagram of a part of a molding device 11 in one embodiment of the invention, FIG. 4 is a diagram of a part of a molding device 21 in one embodiment of the invention, taking the form of cube mold 21, FIG. 5 is a diagram of a part of a molding device 41 in one embodiment of the invention, taking the form of turntable mold 41, and FIG. 6 is a diagram of a container 100 in another embodiment of the invention.

The figures describe particular embodiments of the invention, which is not restricted thereto. Other embodiments, for example with a plurality of containers 100, are conceivable and are not excluded.

When the term "components" is mentioned hereinafter, this term relates not only to individual (pure) starting materials but also to starting materials with additives such as activators, catalysts, etc. For the purposes of the present invention there is always only one component provided in one chamber of a container 100.

FIG. 1 shows a closed container 100 with a total of three chambers 1, 2, 3. Two components A and B are present separately in the chambers 1 and 2. Puncture of the separating wall 5 at a preferential fracture site 6 accompanied by application of a pressure, for example with the aid of the piston 4, can cause the two starting materials to pass into the chamber 3, designed as mixing unit, and to become mixed with one another therein. When the pressure is further increased the valve 7 opens and the mixed components A and B pass into a cavity (not depicted here) of a molding device.

The chamber 3, designed as mixing unit, can comprise a foam through which components A and B are conducted and thus mixed. Equally, the chamber 3 can comprise a static mixer. In a more advanced embodiment of the invention, the preferential fracture site 6 can take the form of mixing nozzle.

FIG. 2a shows the container 100 in a device 11 of the invention, another term also used hereinafter for said device being "mold". The location of the container 100 is in a first mold half 12 with access to a separating plane 13. In a second mold half 14 there is a runner 15 which connects the container 100 to the cavity 16. In the present embodiment the first mold half 12 is heated, optionally only in the region around the container, this being indicated by the two temperatures $T_1$ and $T_2$. By virtue of this hot mold half 12 it is possible to heat the container 100 to a temperature above the reaction temperature of components A and B. Application of a force F, for example to a piston 4 (not depicted here) in the container 100 generates, in the container 100, the pressure that causes the preferential fracture site 6 to fail and begins the mixing of components A and B.

FIG. 2b shows a variant of the embodiment shown in FIG. 2a in which instead of a container 100 with two chambers 1, 2 there are two separate containers 100a, 100b provided, each with one chamber.

FIG. 3 is a diagram of a mold 11 with the two mold halves 12 and 14, separated by the separating plane 13. The runner 15 and the cavity 16 for the component are depicted, alongside the container 100 in the first mold half 12. After injection of components A and B, mixing thereof, charging of material to the cavity 16 in which a reinforcing material (not depicted here) has been previously provided, and hardening it is easily possible to demold the component together with sprue and container 100.

FIG. 4 shows one particular embodiment with a cube mold 21. In this it is possible, after a first step which produces a flat-surface component from at least one starting material as reactive system and at least one reinforcing material, to achieve functionalization by way of ribs and fastening elements through injection molding in a second step. The mold 21 is composed of three parts: a movable, non-rotatable side 22 with the space to receive the container 100, and with a runner 15 between container 100 and cavity 24 for receiving the reinforcing material, a movable part 25 which can be rotated around the vertical axis, and a fixed part 26 installed on the injection side of the injection-molding machine. The mold 21 forms two cavities 24, 29 which have different volumes. The cavity 24 has flat surfaces, with no functional elements. In contrast, the cavity 29 in the fixed mold part 26 has cutouts for ribs 30 or similar functional elements.

The injection unit 27 is depicted diagrammatically. By way of another runner 28 it has connection to the cavity 29 with the cutouts for the functional elements. By way of said runner 28 it is possible to inject additional ribs 30 or other functional elements onto the flat-surface component which is not depicted and which the movement of the movable part 25 has transported from the cavity 24 into the larger cavity 29.

The cube mold 21 has the advantage that up to four positions can be provided for supply of material, the molding process, and removal, so that cycle times can be markedly reduced. In order to simplify the depiction in FIG. 4, this omits material-supply unit and removal unit. It is possible here that the side 22, the movable part 25, and the part 26 are maintained at different temperatures, where the temperature of the side 22 is higher than that of the part 26, for example in order to activate the starting material(s).

FIG. 5 shows one particular embodiment with a turntable mold 41. The mode of operation is similar to that of the variant explained with reference to FIG. 4. In the case of the variant depicted in FIG. 5 the mold half 42 of the mold 41 is rotated around the horizontal axis. Two cavities 43, 44 arise. The first step, the production of a flat-surface component made of at least one starting material and at least one reinforcing material, proceeds in cavity 43. As in the case described above, there are additional cutouts in the cavity 44 for ribs 30 or other functional elements. The cavity 44 has connection by way of a runner 28 to the injection assembly 27 of the injection-molding machine. The functional elements can be molded onto the material by the second step, which is an injection-molding process. The location of the container 100 with reactive components A and B is in the upper part of the mold 41. Along the line indicated by X it is optionally possible to provide a thermal separation plane for the fixed part of the turntable mold 41 in order that, here again, it is possible to achieve different temperatures.

FIG. 6 shows another embodiment of a container 100 in which the arrangement of the piston 4 is such that the mixing unit 3 initially has no volume. Application of traction to the piston rod 8 of the piston 4 allows the two components A and B to pass into the mixing unit 3 through apertures 50a, 50b in the piston 4. Once thorough mixing has been completed the piston 4 is moved back toward the left-hand side, the apertures 50a, 50b being closed (single-sided operation), and the two mixed components A and B are now forced into a cavity.

The design of each container 100 of the invention is such that the metered quantity of reactive component present therein, optionally together with one or more other reactive components, is already that which is required for the component to be produced, the charge therefore being precisely sufficient for one component or for a whole number of identical components.

The container 100 itself can have been manufactured from various materials. It is important that the material of the container 100 is inert with respect to the starting material(s), and protects this/these from environmental effects. Preference is given to polyamide or metals.

With the process of the invention and the device of the invention, a wide variety of products required for everyday use can be produced in the form of reinforced plastics component, and this also applies to specialized applications and in particular to small numbers of units extending as far as individual units. Examples are found in medical technology, specifically in prosthetics, and in the sports sector, for example for splints to fit particular body shapes, or protective elements, or shoe inserts.

The production process, markedly simplified in comparison with the prior art, permits inter alia use of the invention for thermoplastic or thermoset fiber-composite components in a press.

The processing of reactive systems, and the course of the process here are based on the standard processes conventionally used nowadays (cf. by way of example 10/2011, page 190, ISBN: 978-3-446-43047-1). Use of reactive systems to produce components here is based on chemical and physical processes. The combination of the two permits realization of a "bespoke component".

RIM components are generally produced via mixing of liquid components in the presence of various additional substances (in particular catalysts and activators). The property profile here is determined especially by the nature and functionality of the components, the mixing behavior of the components, and also the combination of the selected additional substances.

In a specific example the components, caprolactam with N,N'-hexane-1,6-diylbis(hexahydro-2-oxo-1H-azepine-1-carboxamide) (Bruggolen® C 20) as activator in the first chamber 1 of the container 100 and caprolactam with sodium caprolactamate (Bruggolen® C 10) as catalyst in the second chamber 2 of the container 100, were heated and mixed by using a piston 4 and a mixer unit 3, and then this mixture was used to saturate a woven reinforcing fabric in a cavity. After removal of the component and removal of the container 100 it was possible to undertake a product changeover, which merely required a fresh container 100 with components with different heat-stabilization system and color. Once the container 100 had been inserted it was then possible to begin a fresh saturation process.

A comparative experiment using a conventional process requires flushing of the entire system inclusive of the storage container, the hoses, and the mixing head. In laboratory operation this is achieved by using compressed air to clean the system components mentioned, and then flushing each of the supply lines with 5 kg of pure caprolactam. The time required for melting of the cleaning caprolactam forms the major part of the time required by the cleaning process here, which is 1 h.

The invention claimed is:

1. A process for the production of reinforced plastics components, comprising the following steps:
   a) providing at least one reinforcing material in a cavity of a molding device,
   b) providing at least one starting material in a container, wherein the at least one starting material is both stored and transported in the container,
   c) inserting the container into the molding device,
   d) introducing the at least one starting material from the container directly into the cavity, wherein the at least one starting material passes through a mixing unit, wherein the at least one starting material penetrates at least to some extent through the at least one reinforcing material provided in the cavity,
   e) hardening of the at least one starting material with the at least one reinforcing material to give a reinforced plastics component, and
   f) demolding of the reinforced plastics component;
   wherein the at least one reinforcing material has a surface modification that is chemically and/or physically adapted to the at least one starting material.

2. The process according to claim 1 wherein, in step b), at least one first starting material is provided in a first container and one second starting material is provided in a second container.

3. The process according to claim 2 wherein, before step d), at least the first starting material from the first container, or from a first chamber of the container, and the second starting material from the second container, or from a second chamber of the container, are mixed with one another in a mixing unit.

4. The process according to claim 1, wherein the volume of the at least one starting material corresponds to the unoccupied volume of the cavity of the molding device.

5. The process according to claim 1 wherein, before step c), in step d), or before step e), the at least one starting material is one of thermally activated, chemically activated, and mechanically activated.

6. The process according to claim 1, wherein the at least one starting material additionally comprises at least one of an activator and a catalyst.

7. The process according to claim 2, wherein the first starting material in the first container additionally comprises an activator.

8. The process according to claim 1 wherein, in step c), at least one of at least one activator and at least one catalyst is added to the at least one starting material.

9. The process according to claim 1, wherein the introducing in step d) is achieved by a piston, by reduced pressure in the cavity, or by a squeeze roll which acts on the at least one starting material in the container.

10. The process according to claim 1, wherein the container is selected from the group consisting of tubular bag, double-chamber bag, cartridge, capsule, drum, beaker, cylinder, vessel, pad and combinations thereof.

11. The process according to claim 1, wherein the at least one starting material provided in step b) comprises caprolactam.

12. A device for the production of reinforced plastics components, comprising:
   at least one cavity of a molding device to receive a reinforcing material,
   a reception device to receive at least one container for at least one starting material, wherein the container is configured for storage, transport and introduction of the at least one starting material into the cavity,
   a delivery device for the delivery of the at least one starting material from the container directly into the cavity, and
   for the at least one starting material, a mixing unit arranged between the reception device and the cavity, wherein the mixing unit is integrated into the at least one container.

13. The device according to claim 12, wherein the reception device comprises at least one device for the activation of the at least one starting material in the at least one container.

14. The device according to claim 12, comprising at least one first cavity and one second cavity of the molding device wherein the volume of the at least one first cavity differs from that of the at least one second cavity.

15. An assembly for the production of reinforced plastics components, comprising:
   i) at least one reinforcing material in a cavity of a molding device,
   ii) at least one starting material in at least one container, wherein the container is configured for storage, transport, and introduction of the at least one starting material from the container directly into the cavity, and
   iii) at least one of at least one activator effective for the at least one starting material, and at least one catalyst effective for the at least one starting material,
   wherein the at least one reinforcing material has a surface modification that is at least one of chemically appropriate and physically appropriate for the at least one starting material.

16. The process according to claim 2, wherein the second starting material in the second container additionally comprises a catalyst.

* * * * *